(12) United States Patent
Baker et al.

(10) Patent No.: US 10,088,895 B2
(45) Date of Patent: Oct. 2, 2018

(54) SYSTEMS AND PROCESSES FOR PROVIDING VIRTUAL SEXUAL EXPERIENCES

(71) Applicant: Bent Reality Labs, LLC, Orlando, FL (US)

(72) Inventors: John Baker, Orlando, FL (US); Scott Johnson, Winter Springs, FL (US); Jaime Cisneros, Orlando, FL (US)

(73) Assignee: Bent Reality Labs, LLC, Orlando, FL (US)

( * ) Notice: Subject to any disclaimer, the term of this patent is extended or adjusted under 35 U.S.C. 154(b) by 0 days.

(21) Appl. No.: 15/062,977

(22) Filed: Mar. 7, 2016

(65) Prior Publication Data

US 2016/0260262 A1    Sep. 8, 2016

Related U.S. Application Data

(60) Provisional application No. 62/300,361, filed on Feb. 26, 2016, provisional application No. 62/263,855, filed on Dec. 7, 2015, provisional application No. 62/244,966, filed on Oct. 22, 2015, provisional application No. 62/129,936, filed on Mar. 8, 2015.

(51) Int. Cl.

| | |
|---|---|
| *G06F 3/01* | (2006.01) |
| *G06T 1/20* | (2006.01) |
| *G06T 1/60* | (2006.01) |
| *G06T 19/00* | (2011.01) |
| *A63F 13/428* | (2014.01) |
| *A63F 13/213* | (2014.01) |
| *A63F 13/212* | (2014.01) |
| *A63F 13/352* | (2014.01) |
| *A63F 13/285* | (2014.01) |
| *A63F 13/847* | (2014.01) |

(52) U.S. Cl.
CPC ............ *G06F 3/011* (2013.01); *A63F 13/212* (2014.09); *A63F 13/213* (2014.09); *A63F 13/285* (2014.09); *A63F 13/352* (2014.09); *A63F 13/428* (2014.09); *A63F 13/847* (2014.09)

(58) Field of Classification Search
None
See application file for complete search history.

(56) References Cited

U.S. PATENT DOCUMENTS

| | | | |
|---|---|---|---|
| 6,695,770 | B1 | 2/2004 | Choy et al. |
| 7,762,945 | B2 | 7/2010 | Blumenthal |
| 8,600,550 | B2 | 12/2013 | Kurzweil |
| 9,183,676 | B2 | 11/2015 | McCulloch et al. |
| 9,215,293 | B2 | 12/2015 | Miller |
| 9,256,282 | B2 | 2/2016 | Latta et al. |
| 2006/0079732 | A1 | 4/2006 | Blumenthal |

(Continued)

*Primary Examiner* — Yingchun He
(74) *Attorney, Agent, or Firm* — Jason T. Daniel, Esq.; Daniel Law Offices, P.A.

(57) ABSTRACT

Systems and processes for providing virtual sexual experiences are disclosed for allowing a user to experience a virtual sexual encounter based on the user's real world movements. The system includes a provider platform for generating content having one or more of a sexual avatar and a user avatar. The system also includes a user platform having a motion tracking unit for detecting and tracking the real world physical movements of the user, and manipulating the generated content based on the movement.

20 Claims, 6 Drawing Sheets

(56) References Cited

U.S. PATENT DOCUMENTS

| | | | |
|---|---|---|---|
| 2011/0085704 A1* | 4/2011 | Han | G06T 7/20 |
| | | | 382/103 |
| 2012/0259171 A1 | 10/2012 | Shmakov | |
| 2015/0328082 A1* | 11/2015 | Jiang | A61H 19/00 |
| | | | 600/38 |
| 2015/0366748 A1 | 12/2015 | Cambridge | |

* cited by examiner

SYSTEMS AND PROCESSES FOR PROVIDING VIRTUAL SEXUAL EXPERIENCES

CROSS-REFERENCE TO RELATED APPLICATIONS

This application claims the benefit of U.S. Application Ser. No. 62/129,936, filed on Mar. 8, 2015; Application Ser. No. 62/263,855, filed on Dec. 7, 2015; and Application Ser. No. 62/244,966, filed on Oct. 22, 2015, the contents of each of which are incorporated herein by reference.

TECHNICAL FIELD

The present invention relates generally to sexual aids, and more particularly to devices and systems for creating and manipulating content based upon the detected motion of a user.

BACKGROUND

The statements in this section merely provide background information related to the present disclosure and may not constitute prior art.

There are many different commercially available sexual aid products to facilitate masturbation. Of these, the most common categories include visual aids such as still or video images, along with physical aids such as sexually-oriented toys, for example. Although useful for providing some type of stimulation to a user, these aids lack the ability to provide users with a realistic sense of having a sexual encounter with another living being.

To this end, such aids rely on the user to imagine they are having a sexual encounter with a partner, but provide no active feedback to the user, thereby removing any sense of realism from the experience. Stated differently, still pictures and/or pre-recorded videos used for masturbation cannot respond to the actions and/or physical movements of the user in any meaningful way. Furthermore, recorded videos are not capable of producing independent body part movements—as one would expect from a real sexual experience—but instead provide an "all or nothing" of what was pre-recorded.

Accordingly, there remains a need for a system and process that can generate and/or manipulate content in response to the real world actions and movements of a user, so as to create a realistic sexual encounter between one or more users and one or more virtual partners.

SUMMARY OF THE INVENTION

The present invention is directed to systems and processes for providing virtual sexual experiences. One exemplary embodiment of the present invention can include a provider platform for generating content having one or more of a sexual avatar and a user avatar. The content can be delivered to a user platform for operation by a user. The user platform can include components for detecting and tracking the real world physical movements of the user, and manipulating the generated content based on the movement.

In another exemplary embodiment, the user platform can mapping the movement of a user's body part to a particular body part of one or both of the sexual avatar and the user avatar. The system can position the sexual avatar in an appropriate sexual position, and can display a selected sexual activity between the user avatar and the sexual avatar to the user. The movement of one or both of the avatars during the sexual encounter can be based solely upon the detected movement of the user.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
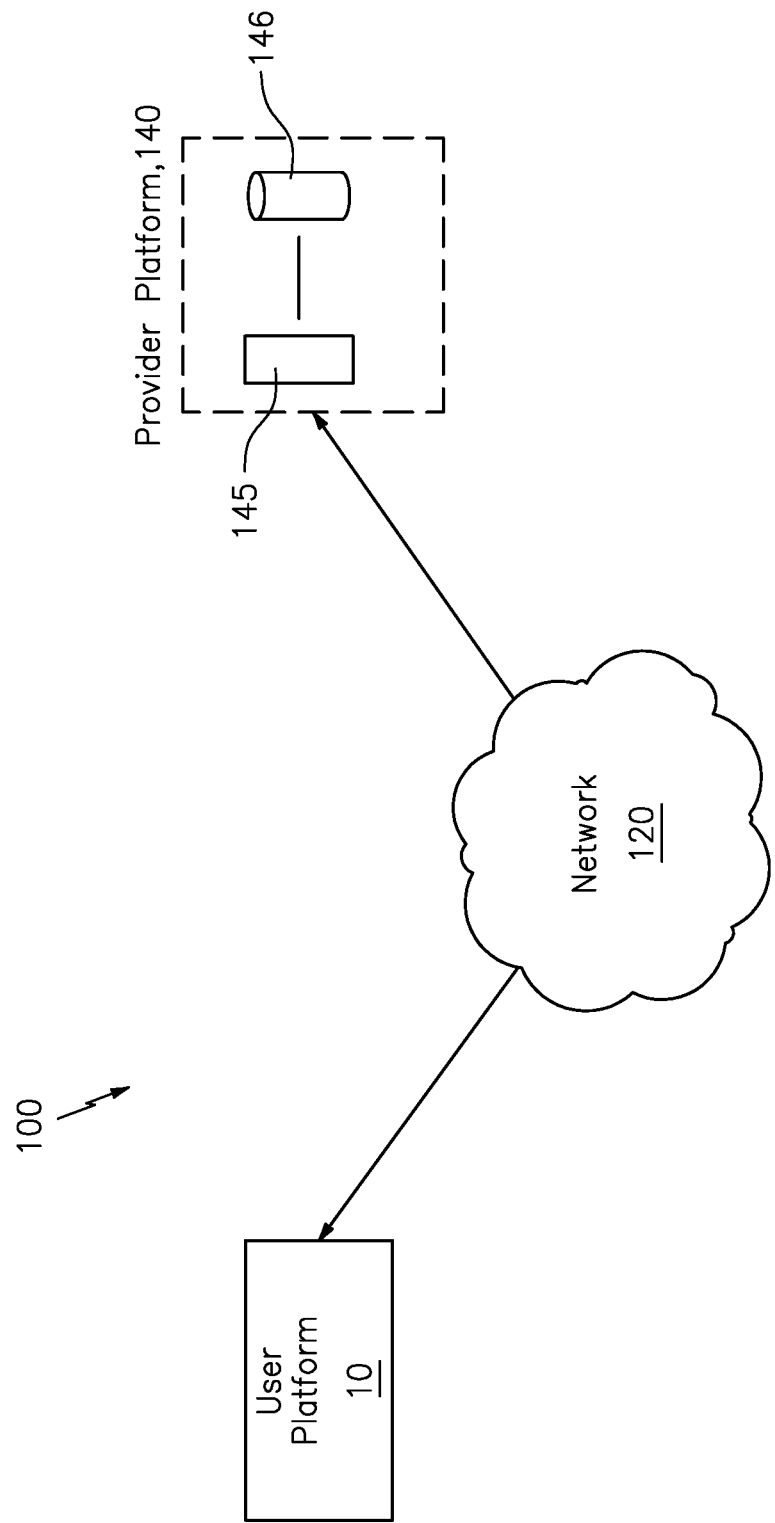
FIG. 1 is a simplistic operating environment of a system for providing virtual sexual experiences, that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

FIGS. 1-5 illustrate various embodiments of systems and processes for providing virtual sexual experiences, that are useful for understanding the inventive concepts disclosed herein. Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 2A.

Definitions

As described throughout this document, the terms "user" and "device user" shall be used interchangeably to describe any person who is operating the user platform.

The term "provider" shall include any individual, group or legal entity that is overseeing, providing and/or performing various aspects of the below described system and/or methodology.

The term "User Avatar" and derivatives thereof shall describe any type of content for display by the user platform to represent a device user.

The terms "Sexual Avatar" and "Virtual Partner" shall be used interchangeably to describe any type of content for display by the user platform as a person or object other than the User Avatar.

The term "content," "generated content," "user content" and derivatives thereof shall include any type of sound, images (e.g., still, motion, live, generated), and/or scents, for presentation to a device user by the user interface. Content can include, but is not limited to: the background environment, one or more Sexual Avatars, the User Avatar and each Avatars' corresponding movements, sounds and smells, for example.

FIG. 1 is a simplistic schematic illustration of an exemplary operating environment of the system 100, that includes a user platform 10, a network 120 and a provider platform 140.

In various embodiments, the network 120 is a transmission medium that facilitates any form or medium or digital or analog communication (e.g., a communication network). Transmission mediums can include one or more packet-based networks and/or one or more circuit-based networks in any configuration. Packet-based networks can include, for example, the Internet, a carrier internet protocol (IP) network (e.g., local area network (LAN), and/or a wide area network (WAN)). Circuit-based networks can include, for example, the public switched telephone network (PSTN), a wireless network e.g., RAN, code-division multiple access (CDMA) network, time division multiple access (TDMA) network, global system for mobile communications (GSM) network, infrared transmissions, Bluetooth or Personal Area Networks (PANs), Near Frequency Communication (NFC) network, and/or other circuit-based networks.

Information transfer over the network 120 can be performed by a communication module based on one or more communication protocols. Communication protocols can include, for example, Hypertext Transfer Protocol (HTTP), Ethernet protocol, Internet Protocol (IP), Voice over IP (VOIP), a Peer-to-Peer (P2P) protocol, Session Initiation Protocol (SIP), a Global System for Mobile Communications (GSM) protocol, a PTT over Cellular (POC) protocol, a Real-time Messaging protocol (RTMP), a Real-time Media Flow Protocol (RTMFP) and/or other communication protocols.

The Provider Platform

The provider platform 140 can work alone, or in conjunction with the user platform 10 to generate content. In various embodiments, portions of the provider platform and/or the user platform can utilize the below described methodology to display the content and/or to manipulate the content in response to information provided by the motion track unit of the user platform. In one embodiment, the provider platform can generate and deliver content to the user platform over the network; however, other embodiments are contemplated wherein the content can be embodied in a computer-readable storage device that is not a propagating signal, such as a physical hard disc drive, or USB memory stick, for example, and the user platform can then run and/or manipulate the generated content without having a connection to the provider platform.

In either instance, the provider platform can include any number of individual processor enabled devices 145 such as computer servers, for example having an internal and/or external memory and that are capable of performing the below described functionality. In this regard, the provider platform can function to communicate with the user platform 10, through any number of different mediums, such as a website that is connected to the internet, for example. The provider platform can also include any number of different databases 146, which can function to receive and store any form of information. Databases can include or comprise all forms of volatile and non-volatile memory and bulk storage devices, such as hard disk drives, removable disks, magneto-optical disks, and/or optical disks, for example.

The provider platform 140 and/or the below described processor enabled device(s) 11 of the user platform 10, can each include any number of different modules/engines for generating and/or manipulating content for the user to experience while utilizing the user platform 10. As such, portions of these engines can each be implemented as a computer program product, i.e., a computer program tangibly embodied in a non-transient machine-readable storage device, for execution by, or to control the operation of, a data processing apparatus/processor enabled device(s). The computer program(s) can be written in any form of computer or programming language, including source code, compiled code, interpreted code, scripting code (e.g., JavaScript) and/or machine code, and the computer program can be deployed in any form, including as a stand-alone program or as a subroutine, element, or other unit suitable for use in a computing environment.

Several exemplary platform engines and engine outputs can include, but are not limited to, the following:

Game Engine—This engine can provide the realistic physics and behaviors of the Sexual Avatar and its environment. The game engine can provide the user with options for configuring traits of the Sexual Avatar's behavior including, but not limited to, vocalized excitement of the avatar, sensitivity to the user's detected motions or facial expressions, amount and/or volume of talkativeness by the avatar, use of certain words or phrases spoken by the avatar, and/or a range of facial expressions and body movements by the avatar.

Animation Engine for Sexual Avatar—This engine can present the Sexual Avatar's visuals to the user based on a real human subject, a fictional subject, or a composite of these two. The Sexual Avatar can be created through pictures, motion capture, video, and/or custom art that collectively create its basis material. In one nonlimiting embodiment, this process can begin with creating a script for a proposed Sexual Avatar. For example, if a real human is to be used (e.g., model) to represent the basis material for the Sexual Avatar, the model can wear one or more markers on their body, so as to allow their body movements to be captured in three-dimensional space, including facial expressions.

Next, the model can act out a script at which time the movements of the model and/or the voice of the model can be captured. The model can then be photographed, digitally scanned, and/or video recorded without the markers (note that the use of markers is dependent upon the motion capture technology used; some technologies are markerless). The recorded motion captures are then parsed manually and/or automatically and/or manually keyframed for needed independent body part movements (e.g., a one second movement of the left arm taken from a one second movement of the entire body's motion capture). These pictures, digital scans, and/or videos can then be used as physical appearance (e.g., skin) for the Sexual Avatar which overlays the animation skeleton, thereby creating a life like whole-body three dimensional image of the model that can move and act in a lifelike manner.

Next, the engine can manipulate the generated sexual avatar in real time to vary speeds and/or directions and/or spatial distance, for example. Sets of one or more body part movements of the avatar are triggered based on information from the user platform 10 and/or the motion tracking unit 20.

In various embodiments, the engine can include thresholds for matching the detected movement of the user with the manipulation of the avatar. For example, if the motion tracking unit 20 detects that the User's hand moves at least one meter per second (i.e., a threshold of data as Principal Motion Input on Behalf of the Sexual Avatar) then the Sexual Avatar can raise its left arm straight up in the air. In the event that independent body movements of the Sexual Avatar do not portray sufficient realism, these movements are then blended together frame-by-frame with inserted artwork, game engine supported blending, and/or other independent pre-created movements. This fills in any missing frames that were not recorded live.

Animation Engine for User—This engine can function to generate a virtual representation of the user (i.e., User Avatar) for inclusion in the content. The User Avatar can include a representation of the users' entire body and/or a portion thereof. In this regard, the user can choose to use a provided avatar to represent his or her body and/or body parts; or the user can provide photos of himself/herself which can be sent to the provider platform and integrated as the skin of the user avatar, as described above. In either instance, movement by the user can be determined by the motion tracking unit 20, and corresponding movement can be imparted onto the User Avatar via the provider platform as content for delivery to the user platform.

Environment Engine—This engine can function to generate the user with the Sexual Avatar(s)'s environment's visuals e.g., inside a room, outside in the rain. This and the Animation Engine for the Avatar are commonly handled by the same device and/or module.

Sound Engine for Sexual Avatar Voice—This is the voice provided by the Sexual Avatar. In the preferred embodiment, this voice is recorded with the motion capture of the real human subject; however, any voice acting can be overlaid as a post-production option. Furthermore, these voices can optionally accompany the same Sexual Avatar. Synchronization of the Sexual Avatar's voice with its mouth animation is accomplished from the motion capture of the mouth of the model that provided the voice. Alternatively, there is existing commercial synchronization software that can be used to cause the Sexual Avatar's mouth and facial expressions to match its voice in real time if a different real human subject is used for the source motion capture and/or voice. In either instance, the Sexual Avatar's voice can be triggered based on the information captured by the motion tracking unit.

Sound Engine for Environmental Sound—This is the sound that the virtual environment would make in the encounter. This can be handled by the same device that enables the Sound Engine for Avatar Voice. These are pre-recorded sounds that are triggered by data thresholds from one or more of the following. In one embodiment, the Environmental sound can be triggered based on the information captured by the motion tracking unit.

In addition to the above, the provider platform can include functionality for generating content by taking live movie footage, and cutting the footage apart frame-by-frame, thereby creating loops from this footage which can be blended together in any order to create a series of individual acts that can be presented to the user.

In one nonlimiting example, another human subject can perform a sexual act on a film set having a plurality of motion picture cameras arranged in a manner so as to capture every part of the model's body. To this end, a transparent floor can be utilized to ensure no portions of the models body are obscured from the camera(s). Once the performance is complete, footage can be reconstructed in 3D. Next, the footage can be cut into loops to be constructed in a logical sequence in real-time in accordance with the instructions and/or captured movement of the user 1. When blending the different loops together, the provider platform will create transitional images (e.g., blending) that can provide smooth transitions between different loops.

In yet another embodiment, the provider platform can include functionality for receiving one or more facial and/or body images from the user platform 10 and/or the user 1, to be included in the content as the face and/or body of the Sexual Avatar. This process can be performed by the provider platform as a custom feature for each user utilizing the above noted procedures and engines.

User Platform

Figure 2A:
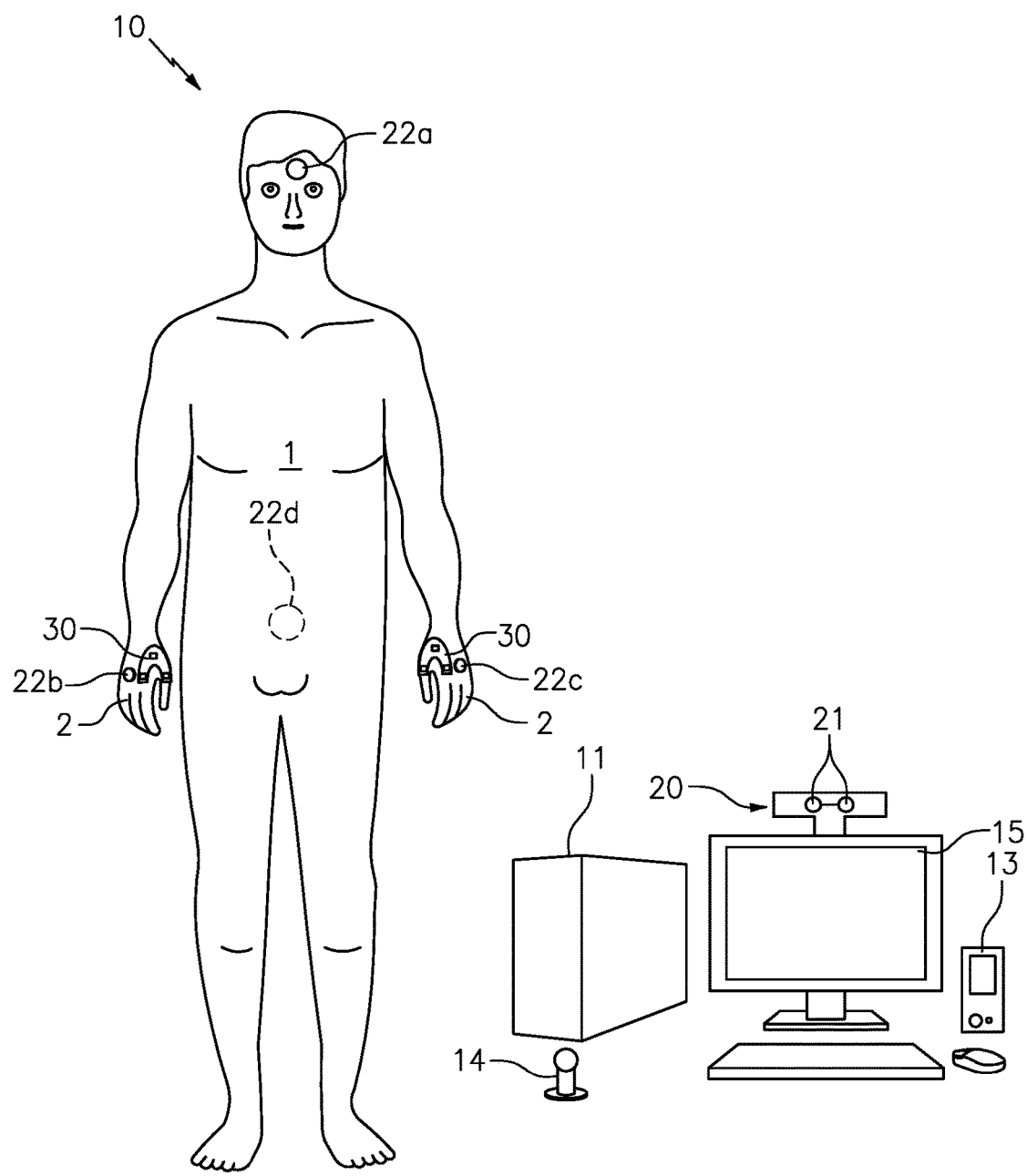
FIG. 2A is a perspective view of the user platform of the system for providing virtual sexual experiences, in accordance with one embodiment of the invention.
Figure 2B:
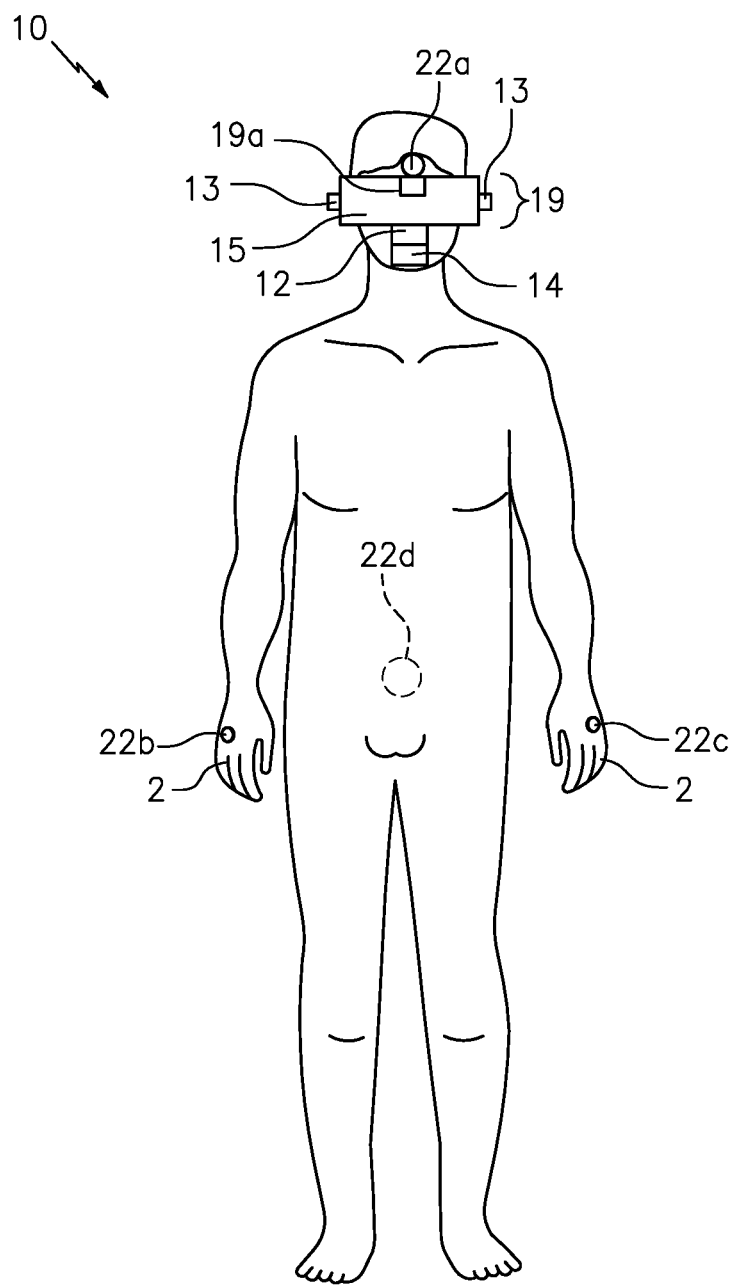
FIG. 2B is a front view of a device user wearing a portion of the user platform, in accordance with one embodiment of the invention.

FIGS. 2A and 2B illustrate various embodiments of the user platform 10, which can function to facilitate two way communication between a human user 1, and the provider platform 140. In the following illustrations, the network and provider platforms are removed solely for ease of illustration. As shown, various embodiments of the user platform 10 can include one or more of the following:

Processor Enabled Device 11. Each of the one or more processor enabled devices can include or comprise one or more computing devices of any form, such as a computer, smart phone, tablet, or other such mechanism that can be operated by a human user and/or can communicate with another machine. The processor enabled device will include physical memory e.g., cache and/or persistent hard drive, and can also include one or more input/output mechanisms such as various buttons, switches, a keyboard, mouse, and/or touchscreen display, for example. In one embodiment, the processor enabled device can include one or more client applications, such as a web browser, for example, which can allow the device user to communicate with the provider platform 140 over the network 120. The device can also include functionality for communicating with the below described motion tracking unit 20 in either a wireless or wired capacity.

Smell-Oriented Input and Output Device 12. The device can be able to detect the odor of the User (e.g., cologne). This odor information can be used as a stimulus to the Sexual Avatar. The device can also emanate one or more odors during the simulated sexual encounter to provide a deeper immersive experience. These odors can be emanated based on one or more of the other inputs from the system. This can include not only the odor of the Sexual Avatar, but also the environment. This is provided by, but isn't limited to existing digital scent technologies. One suitable example can include the multisensory VR mask that is commercially available from FEELREAL.

Speaker 13. This device, also referred to as a Sound-Oriented Output Device, can provide sounds from the Sexual Avatar and the simulated environment. This is provided by, but isn't limited to headphones, wall speakers, desktop speakers, laptop embedded speakers, phone speakers, and/or tablet speakers.

Microphone 14. This device, also referred to as a Sound-Oriented Input Device, can record sound expressions from the User and/or physical ambient noises in the User's environment. These sound expressions can be used as stimulus to the Sexual Avatar and/or to provide instruction to the Sexual Avatar through voice recognition. This is provided by, but isn't limited to a microphone such as a microphone boom attached to headphones, an embedded microphone found on a laptop, embedded microphone found on a tablet, embedded microphone found on a mobile phone, microphone that can be plugged into a desktop computer, and/or any other recording device.

Display 15. This device, also referred to as a Sight-Oriented Output Device, can provide visual content to the User. The display can include or comprise one or more components such as a television screen, a computer monitor screen, a tablet screen, a mobile phone screen, a head-worn screen, and/or a projection, for example. In various embodiments, the display and the processor enabled device can be merged into a single component such as a smartphone or tablet, for example.

Head Mounted Interface 19. As shown in FIG. 2B, the user platform 10 can also include a head mounted interface (HMI) having one or more of an integrated Processor Enabled Device 11, display screen 15, speaker(s) 13, microphone 14, and/or Scent unit 12, for example. One suitable example of an HMI 19 can include the Rift from Oculus® which can be communicatively linked to an external processor enabled device. Another suitable example of an HMI 19 for use herein can include the Gear VR that is commercially available from Samsung® which utilizes a smartphone to perform the functionality of the Processor Enabled Device.

In yet another embodiment, the user platform 10 can incorporate an HMI 19 that is capable of blending real world views with the generated content (i.e., Augmented Reality). One such example can include the Cortex VR that is commercially available from Sulon®. In such an embodiment, all or portions of the User Avatar and/or the environmental engine, for example, can be replaced or supplemented by the real world environment of the user. For example, the HMI display 15 can provide the user 1 with a real time view from a headset mounted camera 19a showing the user what he or she would be seeing if they were not wearing the headset at all. The displayed real world view can then be augmented to include the generated content (e.g., the Sexual Avatar(s)). Of course, other embodiments are contemplated wherein the display 15 includes or comprises a transparent screen member or other such device so as to replace the need for the camera, while still being able to display the generated content to the device user 1.

Motion Tracking Unit 20. The motion tracking unit can include any number of different components that are capable of identifying and/or tracking the location, distance, position and/or orientation of a person(s) and/or object(s) and/or body part(s). In various embodiments, the motion tracking unit can include one or both of a motion capture device 21 that is communicatively linked to the processor enabled device 11, and/or one or more tracking markers/motion trackers, such as markers/trackers 22a-22c, for example; (note that motion capture device 21 does not require tracking markers or motion trackers if it is trackerless as it can recognize the body parts associated with the locations of 22a-22c). The motion tracking unit can preferably detect and track the movement of a person, object or material along six degrees of freedom (6Dof); however, other embodiments are contemplated wherein movement along more or less degrees of freedom are also contemplated.

In various embodiments, any number of individual markers can be positioned along any portion of the user's body 1 via connectors such as double sided tape, for example, in order to allow the movement of the user to manipulate the content the user is experiencing. As will be described below, markers worn on the user's head, such as marker 22a for example, can be used to manipulate the User's View; whereas other markers worn on the user's left hand 22b, right hand 22c and/or hips or back 22d, for example, can be used to manipulate the actions of one or both of the Sexual Avatar and the User Avatar.

It should be noted that marker 22a can also be integrated into/onto the HMI 19, as most smartphones commonly have embedded motion-tracking sensors that detect the movement of the phone itself.

Figure 3B:
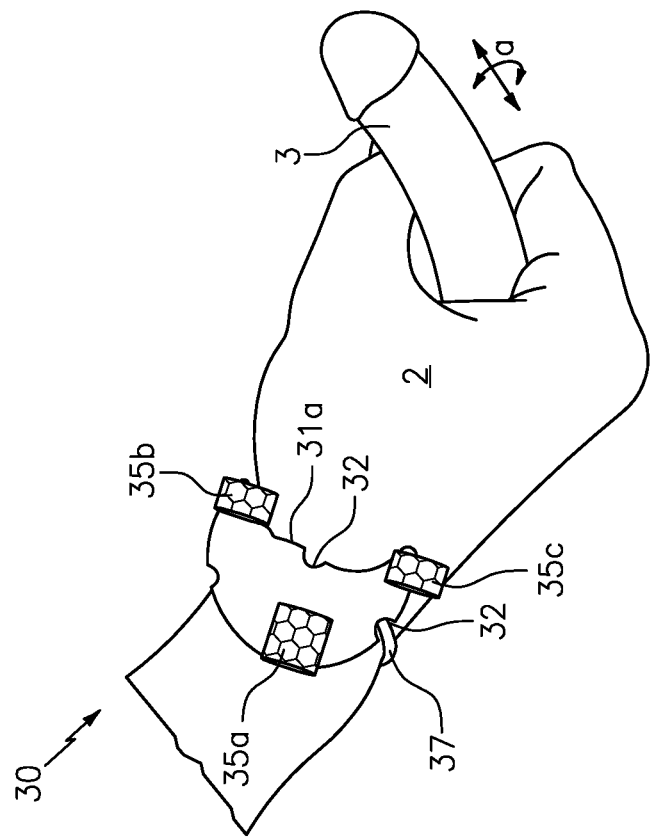
FIG. 3B is a perspective view of the hand tracking device of the system for providing virtual sexual experiences in operation, in accordance with one embodiment of the invention.
Figure 3A:
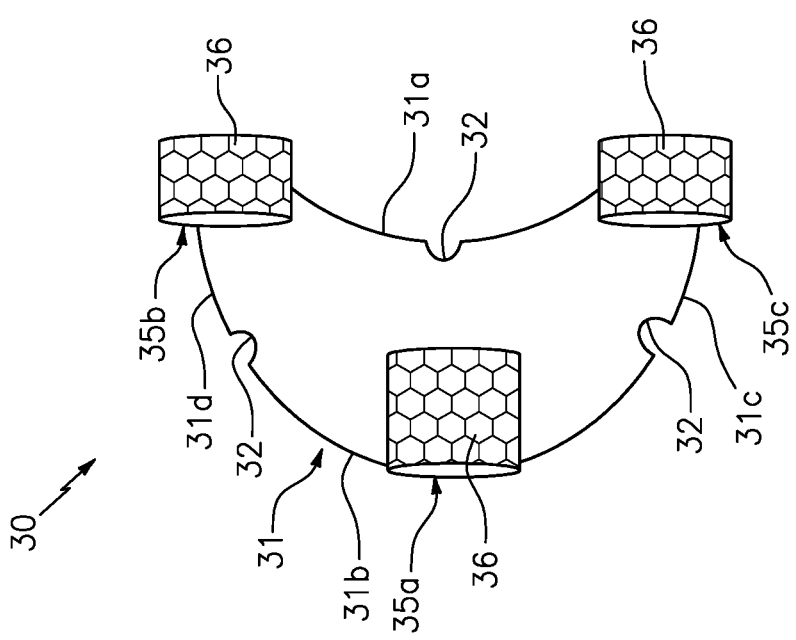
FIG. 3A is a top view of the hand tracking device of the system for providing virtual sexual experiences, in accordance with one embodiment of the invention.

One important aspect of the motion tracking unit will include the ability to accurately track the motion of the user's hand or hands 2 during masturbation. To this end, FIGS. 3A and 3B illustrate one embodiment of a Hand Tracking Device (HTD) 30 that has been developed for use with an IR motion capture device 21, such as the 6Dof TrackIR system that is commercially available from Naturalpoint®, for example.

As shown, the HTD 30 can include a main body 31, having a constellation of individual markers 35 and a user connector 37. In the preferred embodiment, the HTD can be reusable in nature, will have no electronic components, and can be constructed from non-permeable materials so as to resist contamination by bodily fluids. Such features allow the device to be repeatedly used and washed by the user.

The main body 31 can be constructed from any number of thin lightweight materials such as injection molded plastic, for example, and can include an indentation 31a along the front end, a curved rear end 31b and a pair of sides 31c and 31d, forming a generally crescent shaped member to cradle under the base of the thumb joint so hand rotation can be captured. In various embodiments, a series of notches 32 can be disposed about the periphery of the main body, so as to receive and engage the user connector 37 to accommodate left or right-handed use.

The constellation of markers can preferably include three individual markers 35a, 35b and 35c that are mounted along the top surface of the main body in a generally triangular orientation. In one embodiment, the center marker 35a can include a different shape or size than the other markers 35b and 35c, to aid in identifying the location of the device on the user's hand. In either instance, each of the markers can preferably include a generally tubular plastic construction, and can have an IR reflective coating 36, such as reflective tape, for example, along the outside facing surfaces thereof.

The user connector 37 can function to secure the main body 31 onto a user. In the preferred embodiment, the connector 37 can include an elastomeric strap; however, any number of other components such as various adhesives and/or inelastic tethers, for example, can also be utilized so as to allow the device to be removably secured onto a portion of the user's body.

FIG. 3B illustrates one embodiment of the device 30 in operation. As shown, the connector 37 can be looped around the user's wrist and can engage one or more of the main body notches 32, thereby securely positioning the main body onto the user's wrist with the curved portion 31a just beneath the base of the thumb joint.

When so positioned, the triangular and tubular orientation of the markers 35a-35c can allow the IR camera 21 to track the user's hand in 6Dof (see arrow a) while gripping his penis 3. Therefore, by providing an indentation 31a along the front end of the main body, the device can be positioned onto the hand/wrist of the user during masturbation without impeding the ability of the user manipulate their hand (e.g., move, rotate and/or twist) in any way without coming into contact with the User's palm or fingers—which would cause unwanted friction during masturbation. To this end, the HTD 30 can allow the user to rotate and/or move the Sexual Avatar on her axis in 3-dimensional space, thereby allowing the user to get the Avatar into a different position and/or to change the view of the position he is seeing.

Of course, the motion tracking unit is not limited to the use of infrared components, as the motion tracking unit can include or comprise any number of different motion capture devices and/or markers. Several nonlimiting examples include, but are not limited to the following:

Wireless accelerometer sensor—such sensors typically detect and report movement such as pitch, roll, and acceleration in one or more directions. The detected movement can be wirelessly connected to the processor enabled device. In various embodiments, such a sensor 22c will be used in conjunction with a smartphone, for example and can communicate with the smartphone via Bluetooth. Of course, other embodiments contemplating different processor enabled devices and/or communication mediums are also contemplated. One suitable example of a wireless accelerometer sensor includes the wireless Accelerometer tilt sensor that is commercially available from Monnit®.

Markerless tracking unit. As noted throughout the document, the motion tracking unit can also include or comprise various devices that do not require markers at all. One such example includes a motion capture device such as an Infrared Laser Light System, for example, which typically utilizes one or more infrared 3D depth sensors and an RGB camera to generate structured light that can be used to infer depth. This information is combined with other vision techniques such as depth from focus, and depth from stereo, to be able to track the location and movements of a target, such as a user's entire body and/or a portion thereof, without requiring the user to wear a marker. One suitable example of such a system includes the Kinect that is commercially available from Microsoft®.

A/C Electromagnetic Field System—such systems utilize an electromagnetic field to determine the position and orientation of designated packs that can be worn by a user. One suitable example of such a system includes the STEM System that is commercially available from Sixense®.

Sight-Oriented Input Device—The device can scan facial expressions of the User. This information can be used as a stimulus to the Sexual Avatar, thereby allowing the Sexual Avatar to react (via the below described Engines) to the User's facial expressions. One suitable example includes the Conjure VR controller that is commercially available from Reach Bionics, Inc.

Use and Operation

In operation, once the user has connected the user platform to the provider platform to receive content, he or she can utilize the motion tracking unit 20 to manipulate the content in any number of different manners, so as to create a realistic virtual sexual encounter with one or more Sexual Avatars that will react to the users movements as a real person would. As such, the motion tracking unit can be configured to track the movement of any part of the user's body, such as his/her head, hand(s) and/or hip(s), for example, to manipulate the content in several distinct ways, such as the ways described below, for example.

Manipulation of the User view—In addition to using the mouse or other I/O component to change the view on the display screen 15, the user platform can function to track the movement of the user's head to perform this task. For example, when the motion tracking platform detects that the user has moved their head to the left, right, up, down, forward, backward and/or in an angular direction, the content on the display 15 can be manipulated to match the angle/direction of the detected movement (i.e., a user view). To this end, the user platform can utilize the HMI 19 and/or marker(s) 22a and/or a camera 21, as described above. As such, when this feature is enabled and the user moves their head forward, the Sexual Avatar will appear to be closer to him; likewise, if the user tilts his head up or down, he will be able to look up and down at the Sexual Avatar's body.

Manipulation of the Avatar(s)—In one embodiment, the actions of the Sexual Avatar presented to the user 1 via the user platform 10 can correspond to the user's own movements, as detected by the motion tracking unit 20. As such, the user can provide instructions to the user platform 10 to map a portion of their body e.g., hand, hips, lower back, penis, feet, etc., to an similar portion of the Sexual Avatar's and/or User Avatar's body e.g., hand, hips, lower back, penis, feet, etc., respectively, to control a movement of the same.

Moreover, the user can also provide instructions to the user platform 10 to map a portion of their body e.g., hand, hips, lower back, penis, feet, etc., to an dissimilar portion of the Sexual Avatar's and/or User Avatar's body e.g., a body portion other than a corresponding hand, hips, lower back, penis, feet, etc., to control a movement of the same. In this regard, the user's real world action/movement(s) will be exactly replicated by the assigned body part of the selected avatar (i.e., virtual movement), thereby functioning as a "puppet string" for controlling the same.

Figure 4:
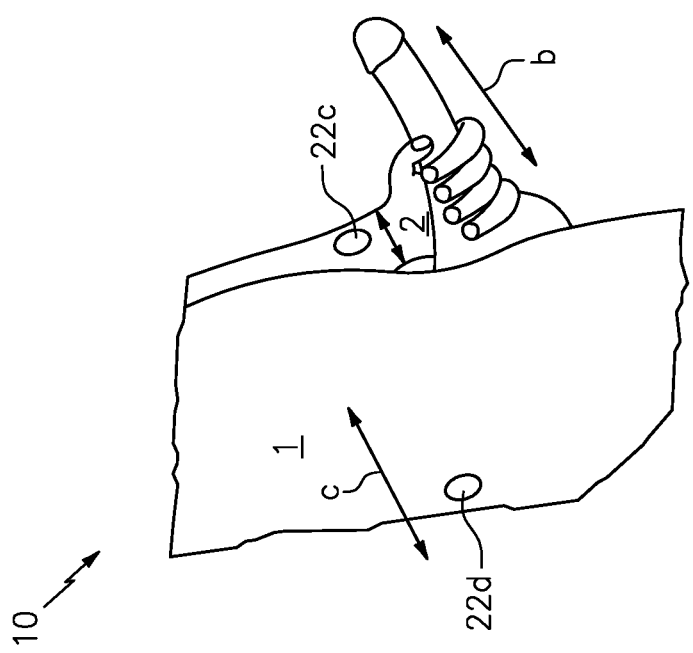
FIG. 4 is a perspective view of the system for providing virtual sexual experiences in operation, in accordance with one embodiment of the invention.
Figure 4:
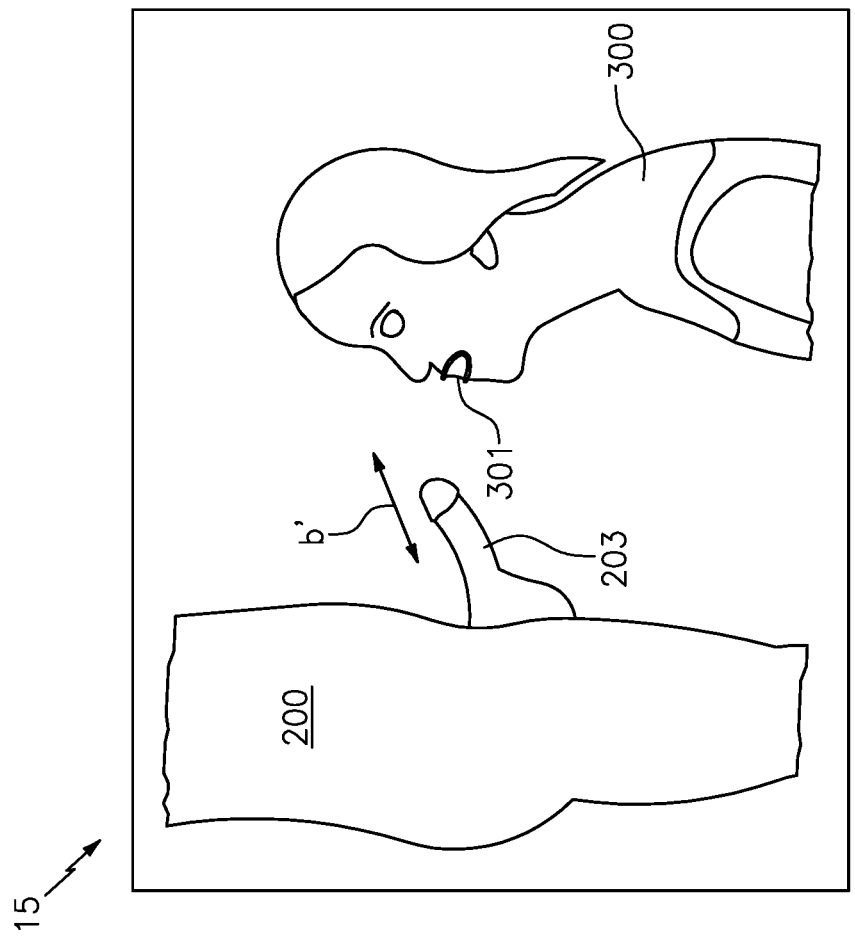

FIG. 4 illustrates one nonlimiting example of this functionality that is useful for understanding the inventive concepts disclosed herein. In the present example, the user 1 can utilize the user platform 10 to enjoy a virtual sexual encounter wherein he engages in virtual oral sex while performing the physical act of masturbation. In such an embodiment, the user 1 can instruct the user platform 10 to generate a User Avatar 200 (i.e., a virtual representation of himself) having a penis 203, and a Sexual Avatar 300 (i.e., a virtual representation of a sexual partner) having a mouth 301.

Upon receiving the user commands, the system can map the user's hand 2, to the mouth 301 of the Sexual Avatar by the steps described above. At this time, the user platform can automatically position the imagery of the Sexual Avatar 300 on the display 15 to an appropriate position (i.e., appropriate sexual position) for the selected sexual encounter, such as a sitting or kneeling position, for example. Next, the user can begin to masturbate, and the motion tracking platform 20 can detect the user's hand movements in 6Dof. Therefore, as the user's hand 2 moves up and down the shaft of his penis 3 (see arrow b), the user platform will display content showing the Sexual Avatar's mouth 301 moving (See arrow b') along the virtual penis 203 lock step with the motion of the user's hand.

Although described above with regard to virtual oral sex between a male User Avatar 200 and a female Sexual Avatar 300, this is for illustrative purposes only. To this end, the system 100 can function to generate any virtual sexual encounter that is desirable to a user. Several nonlimiting examples include, but are not limited to, heterosexual activities e.g., penis to vagina, penis to anus, penis to breasts, penis to feet or hands, etc.; homosexual activities e.g., penis to anus, penis to mouth, penis to penis, etc.; and/or nonhuman encounters wherein one or both of the User Avatar and the Sexual Avatar include nonhuman forms e.g., animal, alien, or inanimate objects, for example. In such a scenario, the portion of the nonhuman form to which the user's motion is mapped shall be referred to as an orifice, even if the orifice does not include an actual opening.

In either instance, during the sexual encounter, the system will display the User Avatar and the Sexual Avatar's bodies with physically correct energy propagation (e.g., breast oscillation, wave energy traveling through the Avatar's skin) utilizing a physics engine, in order to illustrate a realistic sexual experience wherein the Avatar(s) provide measured responses to the detected movement of the user. For example, the system can show the visual elements of the Sexual Avatar, such as breast oscillation that is commensurate with the speed and/or veracity of the masturbation movements. Therefore, as the user increases or decreases his rate of motion, the Sexual Avatar and/or User Avatar will increase or decrease their rate the motion accordingly, along with the energy propagations.

The system can also include functionality for transitioning the mapped body parts from the Sexual Avatar to the User Avatar and vice versa. For example, the user may next instruct the platform 10 to have the motion tracking unit capture the movement of the user's hip thrusts via marker 22d, for example, and to map this movement to the User Avatar penis 203. At this time, the user will view content wherein the motion (arrow b') of the User Avatar's penis 203 engages the mouth 301, or other selected body part, of the Sexual Avatar 300 lock step with the motion of the user's hip thrusts (see arrow c).

During this operation, the Sexual Avatar can respond vocally and/or physically to the user 1 through the user's simulated conscious body and/or body part movements (i.e., measured responses). This can be performed via the detected movement(s) of the User, the users' voice commands, vocal expressions, time of use, and/or behaviors as configured for the Sexual Avatar in the game/animation engines described above. Such features provide a unique and realistic physical sexual encounter that is driven by the actions of the user.

Figure 5:
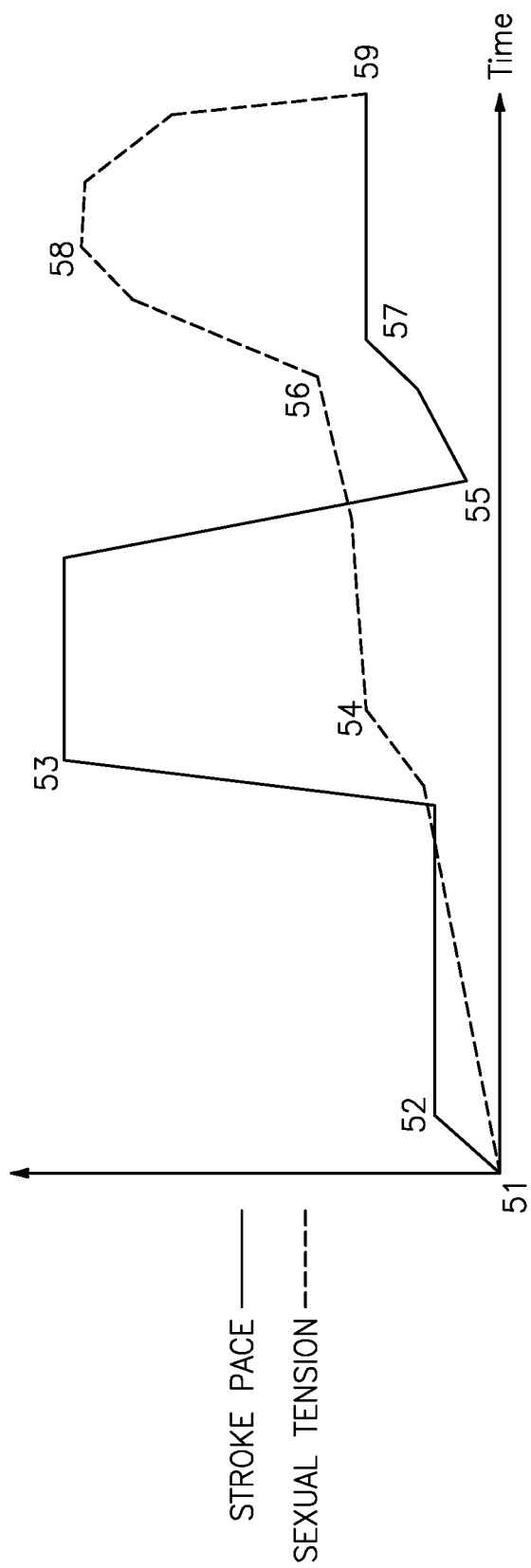
FIG. 5 is an exemplary flowchart illustrating a process for the system for providing virtual sexual experiences, in accordance with one embodiment of the invention.

FIG. 5 is an exemplary flowchart illustrating the functionality of the system to generate measured responses based only on the detected movement of the user for simplified illustrations purposes, but is not limited to include the use of the user's odor and/or user's vocalizations and/or user's facial expressions. As shown, the user's stroke pace is measured by how many complete and/or partial cyclic strokes are made along his penis over time using data from motion tracking unit 20 as input to user platform 10 and its embedded game engine; this calculation is represented by the solid line.

A mathematical formula that is stored within the provider platform and/or the user platform uses this information to calculate a sexual tension for determining measured responses by the Sexual Avatar. As shown, the calculated sexual tension is represented by the dashed line, and is partly guided by configurable sensitivity traits of the Sexual Avatar via the game engine, as well as user motion such as the total strokes, changes in stroke pace, and other factors. The calculated sexual tension corresponds with several measured responses of the Sexual Avatar that are cached in the game engine, so as to be manifested to the user at appropriate times.

In the illustrated example, the user begins masturbating at 51 and the stroke pace accelerates gradually until it reaches a constant rate 52. At this time, the system can assign a low sexual tension to the detected activity of the user, and can manifest a low tension cached measured response for the Sexual Avatar to perform, such as the Sexual Avatar saying, "Mmmm" quietly, for example.

If a steep increase in stroke pace acceleration is detected 53, and/or the stroke pace goes beyond a pre-defined threshold, the system can increase the intensity of the measured response to manifest a high tension cached measured response 54 for the Sexual Avatar to perform that is appropriate for a sudden change of stroke rate. For example, the Sexual Avatar can yelp "Ah!" or say "harder", for example. This can continue until the system detects a decrease in stroke pace 55, thereby causing the avatar to manifest a decreasing cached measured response 56 for the Sexual Avatar to perform that is appropriate for the decreasing stroke rate. For example, the Sexual Avatar can respond by saying "I like it slow," for example.

As the system continues to measure the users stroke pace over time, the user can eventually pass a pre-defined threshold 57 as determined by the algorithm, wherein the system can assign a dramatic rise in sexual tension 58. At this time, the system can manifest a climactic cached measured response 54 for the Sexual Avatar to perform. For example, the Sexual Avatar can respond with the physical appearance of having an orgasm and/or the appropriate facial and verbal responses to the same such as shouting the user's name, for example. Finally, as the detected stroke rate decreases or stops, the sexual tension decreases 59. Notwithstanding, the user at this point can continue to masturbate, causing the sexual tension to rebound upwards over time.

Although described above as utilizing a single Sexual Avatar and a single user, many other variations are also contemplated. For example, the above described functionality can be utilized with a plurality of different Sexual Avatars that are mapped to different body parts of the user. For example, a first Sexual Avatar can be mapped to marker 22b, a second Sexual Avatar can be mapped to marker 22c, and so on. Moreover, any number of different users can utilize the user platform 10 to have their body parts mapped to one or both of the User Avatar and the Sexual Avatar(s), in the same manner described above.

For example, the real life partner of the user 1 can wear a plurality of motion trackers and/or use the trackerless motion technology to allow his or her movements and/or facial expressions to dictate the movements of the Sexual Avatar's body and/or facial expressions. Moreover, when real world intercourse occurs, the user 1 can participate in a real world sexual activity with his partner while simultaneously engaging in a virtual sexual encounter with one or more Sexual Avatars.

To this end, the virtual sexual encounter can be a different sexual act than that occurring in the real world, and one or more of the Sexual Avatars participating can be controlled by the user 1, and/or the user's real life partner. For example, in one embodiment, the motion of the real life partner's hand can be mapped to a body part of a Sexual Avatar, such as the vagina, in the manner described above, thereby allowing the user to receive a hand release from their partner in real life while experiencing virtual sexual intercourse through the user interface display 15. As such, the system can allow any number of different users to be mapped to any number of virtual User and/or Sexual Avatars, thereby creating a multi-person fully immersive virtual sexual experience.

Although described above with respect to particular body parts and/or sexual actions, this is for illustrative purposes only, as the system can assign any user movement to correspond to any body part of one or both of the Sexual Avatar and the User Avatar.

In the preferred embodiment, however, each real world user will preferably be represented by a corresponding User Avatar representing their body and movements. Such a feature allows each of the one or more users to control one or more body parts of their own User Avatar, and to also control at least one or more body parts of at least one or more Sexual Avatars at the same time. One example of the preferred embodiment contemplates two people, Users A and B, masturbating together with one sexual avatar that is shared between them. User A has the sexual avatar's vagina assigned to his left hand and the sexual avatar's anus assigned to his right hand. The sexual avatar is on top of User B with User A's left hand masturbating User B. User B will see the sexual avatar have vaginal sex with him. Meanwhile User A is masturbating with his right hand, thereby presenting him with anal sex of the sexual avatar at the same time User B is giving her vagina sex (a "double play" as the industry calls it).

Regardless of the selected sexual position(s) mapped body part(s), and/or number of users, the system can display the User Avatar(s) and the Sexual Avatar(s) to the user(s) in a manner that provides realistic actions and reactions based on the user input. These actions can include, but aren't limited to, facial expressions, arm movements, leg movements, abdomen movements, that are generated by a physics engine to ensure realistic and independent body and/or facial movements and/or sounds by the sound engine by the Sexual Avatar and/or User Avatar.

In addition to the above, the user platform can include functionality for allowing the user to change a particular assignment in real-time by voice command or via any of the input/output mechanisms. Such a feature is advantageous, as it allows a user to seamlessly perform different sexual acts with the Sexual Avatar in a seamless manner. Upon instructing the user platform to implement this change, the system can generate unique content that shows the Sexual Avatar reacting to this new assignment through a smooth transition of animation and/or audio.

For example, the user may wish for his hand to transition its representation from the Sexual Avatar's mouth to the Sexual Avatar's vagina. As such, upon receiving the user command (i.e., a second map command), such as a voice command, the Sexual Avatar may temporarily ignore the user's motion, while transitioning from a kneeling position to another appropriate sexual position for the new sexual act, such as the prone position, for example. Once in the new position, however, the actions of the Sexual Avatar can resume their correspondence to the motion of the user.

Accordingly, the above described systems and processes for providing virtual sexual experiences functions in a unique manner to generate and/or manipulate content in response to the movements of a user, so as to create a realistic sexual encounter between the user and one or more virtual partners. Moreover, the functionality described herein represents a substantial computational improvement over other forms of digital content that does not severely affect the performance of the computer(s) on which it is performed.

Improvement to computing: As noted above, a physics engine is utilized to achieve realistic sexual encounters, however, the present system 100 requires significantly less processing of physics data because collisions between virtual objects (e.g., body parts) within the present system do not have to be calculated. In this regard, collisions are typically computationally expensive for computers because they must perform complex math to determine when two irregularly shaped virtual objects will occupy the same space. In the present system, the collisions don't require computation because the user's real body part(s) collide with the user's own body. For example, take the case of a real human user, that user's avatar, and a virtual avatar of another character. The user assigns his left hand to be the other avatar's right hand. The movement controls are set so the movement of the user's left hand towards his own physical body will cause the avatar's right hand to move towards the user's avatar's body. Once the user's left hand physically touches his own body, the avatar's right hand will appear that it is touching the user's avatar—as if it were colliding. The difference is that no complex collision calculations are required because the user's own body takes care of the collision for the computer.

Moreover, the present system 100 greatly reduces the time, the programming, and computing requirements for the placement of where a virtual object (e.g., a body part(s)) is in relation to the user in a virtual environment at all times. Outside of the present system, the placement of a virtual object would require depth-sensing technology to determine precisely where a virtual object should be given the location of the user and the user's environment so the virtual object would be where the user expects in relation to their own virtual avatar in realtime because movement between the virtual object and the user may occur. This requires computing time for the system to calculate where the object should be displayed in relation to the user (as represented by the user's avatar); this causes latency in the system and reduces stability because it requires specialized programming. Because the present system is using the body part(s) of the user to act on behalf of the virtual object, this calculation is no longer necessary: The user explicitly controls where the virtual object is in relation to their body because it is their own body part(s) that maintains that location.

To this end, the inventive concepts disclosed herein provide an improvement to video game technology and the control thereof, by allowing a single user/player to independently represent and/or physically manipulate multiple avatars in a virtual setting. Each of these movements can be based on detected movements of the user, thereby eliminating the need for a conventional video game controller. Such a feature also functions to improve the operating performance of the User's computer, by reducing the number of peripherals it is required to control, and eliminating the memory and cache space necessary to operate the same.

Although described throughout this document as a sexual aid system, the inventive concepts are not to be construed as limiting to any particular use or industry. As such, the features and interconnection between system components, and improvements thereto, can be utilized in virtually any industry to create and/or control the any number of avatars and to control the actions of any such avatars from any point of view and/or to control the actions of other avatars' body part(s) from any point of view. Two other industries and improvements thereto include can include:

Phobia Therapy. Someone with a fear of spiders can have their hand control the movement of a spider in the virtual environment and have it move towards or away from them to desensitize them.

Grief counseling to re-live the company of a past pet or loved one. For example, a widow could use her hand to represent the sitting/standing location of her deceased husband. As opposed to trying to program his personality in how he would move, she would directly control it. It would be as if he was right next to her.

Finally, although the above described system 100 has been described as utilizing a provider platform that is separate from the user platform, other embodiments are contemplated wherein the provider platform and the user platform, or portions thereof, can be merged into a single platform such as a single computer or entertainment system, for example.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for providing a virtual sexual experience to a user, said system comprising:
    a provider platform that includes one or more computing devices each having a physical memory bearing instructions that, upon execution by the one or more computing devices generates content, said content including a user avatar and a sexual avatar; and
    a user platform for receiving the generated content, said user platform including
        a display that provides a visual representation of the generated content,
        a motion tracking unit that includes components for detecting a user's body and tracking a motion thereof,
        a processor enabled device that is communicatively linked to each of the display and the motion tracking unit, said processor enabled device having a memory for storing a portion of the generated content, and
        said memory includes instructions that, upon execution by the processor enabled device maps a portion of the detected user's body to a portion of the sexual avatar's body, and displays a sexual activity,
    wherein during the sexual activity the mapped portion of the sexual avatar moves lock step with a motion of the mapped portion of the detected users body,
    wherein the portion of the detected user's body and the portion of the mapped sexual avatar's body belong to different corresponding parts of the detected users body and the sexual avatar's body.

2. The system of claim 1, wherein the memory of the processor enabled device further includes functionality for mapping a movement of a portion of the detected user's body to a movement of a similar portion of the body of the sexual avatar.

3. The system of claim 1, wherein the memory of the processor enabled device further includes functionality for mapping a movement of a portion of the detected user's body to a movement of a dissimilar portion of the body of the sexual avatar.

4. The system of claim 1, wherein the memory of the processor enabled device further includes functionality for manipulating the user avatar based on a detected movement of the user, and
    for mapping a movement of a portion of the detected user's body to a movement of a similar portion of the body of the user avatar.

5. The system of claim 1, wherein the memory of the processor enabled device further includes functionality for manipulating the user avatar based on a detected movement of the user, and
    for mapping a movement of a portion of the detected user's body to a movement of a dissimilar portion of the body of the user avatar.

6. The system of claim 1, wherein the memory of the processor enabled device further includes functionality for manipulating the user avatar based on a detected movement of the user, and
    for mapping a movement of a first portion of the detected user's body to a movement of a portion of the body of the sexual avatar, and mapping a movement of a second portion of the detected user's body to a movement of a portion of the body of the user avatar.

7. The system of claim 1, wherein, said sexual activity includes an interaction between one or more of the user avatar's vagina, anus, mouth, hands, orifice, penis and breasts,
    with one or more of the sexual avatar's vagina, anus, mouth, hands, orifice, penis and breasts.

8. The system of claim 1, wherein the motion tracking unit is configured to detect and track a movement of at least one of a head, a hand, and a hip of the user.

9. The system of claim 8, wherein the memory of the processor enabled device includes functionality for receiving a map command that specifies a sexual activity, and
    upon receiving the map command, mapping a detected movement of at least one of the user's head, hand and hip to a movement of at least one of the user avatar's vagina, anus, mouth, hands, orifice, penis and breasts.

10. The system of claim 9, wherein upon receiving the map command, the user platform positions the sexual avatar in an appropriate sexual position for the specified sexual activity.

11. The system of claim 8, wherein the memory of the processor enabled device includes functionality for receiving a map command that specifies a sexual activity, and
upon receiving the map command, mapping a detected movement of at least one of the user's head, hand and hip to a movement of at least one of the sexual avatar's vagina, anus, mouth, hands, orifice, penis and breasts.

12. The system of claim 11, wherein upon receiving the map command, the user platform positions the sexual avatar in an appropriate sexual position for the specified sexual activity.

13. The system of claim 12, wherein the memory of the processor enabled device includes functionality for receiving a second command that includes at least one of a second map command and a second sexual activity, and
upon receiving the second command, the user platform automatically positions the sexual avatar in a second appropriate sexual position that corresponds with the second sexual activity.

14. The system of claim 1, wherein the memory of the processor enabled device further includes functionality for causing the sexual avatar to perform a measured response to the detected movement.

15. The system of claim 14, wherein an intensity the measured response is based upon the detected movement over time.

16. The system of claim 15, wherein an intensity the measured response is based upon a veracity of the detected movement.

17. The system of claim 1, wherein the motion tracking unit is configured to detect and track a movement of at least one of a head, a hand, and a hip of the user; and
wherein the memory of the processor enabled device includes functionality for mapping the detected movement of at least one of the user's head, hand and hips to a movement of at least one of the user avatar's vagina, anus, mouth, hands, orifice, penis and breasts, and
for mapping the detected movement of another one of the at least one user's head, hand and hips to a movement of at least one of the sexual avatar's vagina, anus, mouth, hands, orifice, penis and breasts.

18. The system of claim 1, wherein the motion tracking unit comprises:
one or more markers each having a connector that is configured to be removably secured to at least one of a head, a hand, and a hip of the user; and
a motion capture device that is encoded with instructions for detecting and tracking a movement of each of the one or more markers, and reporting the same to the processor enabled device.

19. The system of claim 8, wherein the motion tracking unit comprises:
a markerless motion capture device that is encoded with instructions for detecting and directly tracking a movement of each of a head, a hand, and a hip of the user, and reporting the same to the processor enabled device.

20. The system of claim 1, further comprising:
a head mounted interface for securing the display onto the body of the user, and
wherein the memory of the processor enabled device further includes functionality for manipulating a user view of the generated content based upon a movement of the head mounted interface.

* * * * *